United States Patent
Dombkowski et al.

(10) Patent No.: US 7,840,807 B2
(45) Date of Patent: Nov. 23, 2010

(54) AUTHENTICATION OF COMPUTING DEVICE THROUGH EMPLOYMENT OF DETERMINATION THAT CURRENT LOCATION OF AUTHENTICATION DEVICE MATCHES INITIAL LOCATION

(75) Inventors: Kevin Eugene Dombkowski, Oswego, IL (US); Charles Arthur Witschorik, Naperville, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 1129 days.

(21) Appl. No.: 10/803,718

(22) Filed: Mar. 18, 2004

(65) Prior Publication Data
US 2005/0210265 A1    Sep. 22, 2005

(51) Int. Cl.
*H04L 9/00* (2006.01)
(52) U.S. Cl. .............. 713/170; 713/185; 713/300; 713/168; 713/324; 726/36
(58) Field of Classification Search ............ 713/170, 713/185
See application file for complete search history.

(56) References Cited

U.S. PATENT DOCUMENTS

| | | | | |
|---|---|---|---|---|
| 4,870,526 | A | * | 9/1989 | Maruta et al. ............ 361/1 |
| 5,517,567 | A | * | 5/1996 | Epstein ............ 380/247 |
| 6,166,649 | A | * | 12/2000 | Inoue ............ 340/660 |
| 7,420,596 | B2 | * | 9/2008 | Niimura ............ 348/231.3 |
| 2002/0141594 | A1 | * | 10/2002 | MacKenzie et al. ...... 380/286 |
| 2004/0059914 | A1 | * | 3/2004 | Karaoguz ............ 713/168 |
| 2007/0088950 | A1 | * | 4/2007 | Wheeler et al. ............ 713/170 |

FOREIGN PATENT DOCUMENTS

JP      2003323599      * 10/2003

* cited by examiner

*Primary Examiner*—David García Cervetti
*Assistant Examiner*—Fikremariam Yalew
(74) *Attorney, Agent, or Firm*—Carmen Patti Law Group, LLC

(57) ABSTRACT

A authentication device of an apparatus in one example authenticates a computing device, in communication with the authentication device, through employment of a determination that a current location of the authentication device matches an initial location of the authentication device.

28 Claims, 6 Drawing Sheets

AUTHENTICATION OF COMPUTING DEVICE THROUGH EMPLOYMENT OF DETERMINATION THAT CURRENT LOCATION OF AUTHENTICATION DEVICE MATCHES INITIAL LOCATION

TECHNICAL FIELD

The invention relates generally to computing device networks and more particularly to authentication of computing devices.

BACKGROUND

Businesses and consumers desire security when transferring information between computing devices. For example, a user of a receiving computing device may request information such as digital content, sensitive documents, and financial information from a sending computing device over a network connection. The users of the sending and receiving computing devices do not want such information end up in the wrong hands. The users do not want information they send over the Internet to be received by an intercepting computing device that deceives the sending computing device into believing that the intercepting computing device is the receiving computing device. Also, the users of the computing devices are wary of identity theft such as theft of credit card numbers and/or personal identification information.

As one attempt to securely transfer the information between the sending and receiving computing devices, the sending computing device in one example encrypts the information to guard against spoofing and theft. For example, users of the sending and receiving computing devices employ shared keys to encrypt and decrypt the information so that if the information ends up at an incorrect destination (e.g., the intercepting computing device), a user of the intercepting computing device could not decrypt the information. As one shortcoming, the user of the intercepting computing device may obtain a copy of the shared keys or the user of the intercepting computing device may hack into the information without requiring the shared keys.

As another attempt to securely transfer the information between the sending and receiving computing devices, the sending computing device in one example confirms an internet protocol ("IP") address that identifies the receiving computing device. As another shortcoming, the intercepting computing device may spoof the internet protocol address of the receiving computing device. For example, the information may be sent to the intercepting computing device attempting to appear to be at the internet protocol address of the receiving computing device.

Thus, a need exists for a network security component that serves to prevent an intercepting computing device from obtaining information sent between sending and receiving computing devices.

SUMMARY

The invention in one embodiment encompasses an apparatus. The apparatus comprises an authentication device that authenticates a computing device, in communication with the authentication device, through employment of a determination that a current location of the authentication device matches an initial location of the authentication device.

Another embodiment of the invention encompasses a method. A request is received from a second computing device to authenticate a first computing device for a data transfer from the second computing device to the first computing device. A current location of an authentication device is determined, in communication with the first computing device, in response to the request from the second computing device. The first computing device is authenticated if the current location of the authentication device matches an initial location of the authentication device.

Yet another embodiment of the invention encompasses an article. The article comprises one or more computer-readable media. The article comprises means in the computer-readable medium for receiving a request from a second computing device to authenticate a first computing device for a data transfer from the second computing device to the first computing device. The article comprises means in the computer-readable medium for determining a current location of an authentication device, in communication with the first computing device, in response to the request from the second computing device. The article comprises means in the computer-readable medium for authenticating the first computing device if the current location of the authentication device matches an initial location of the authentication device.

DESCRIPTION OF THE DRAWINGS

Features of exemplary implementations of the invention will become apparent from the description, the claims, and the accompanying drawings in which:

DETAILED DESCRIPTION

Figure 1:
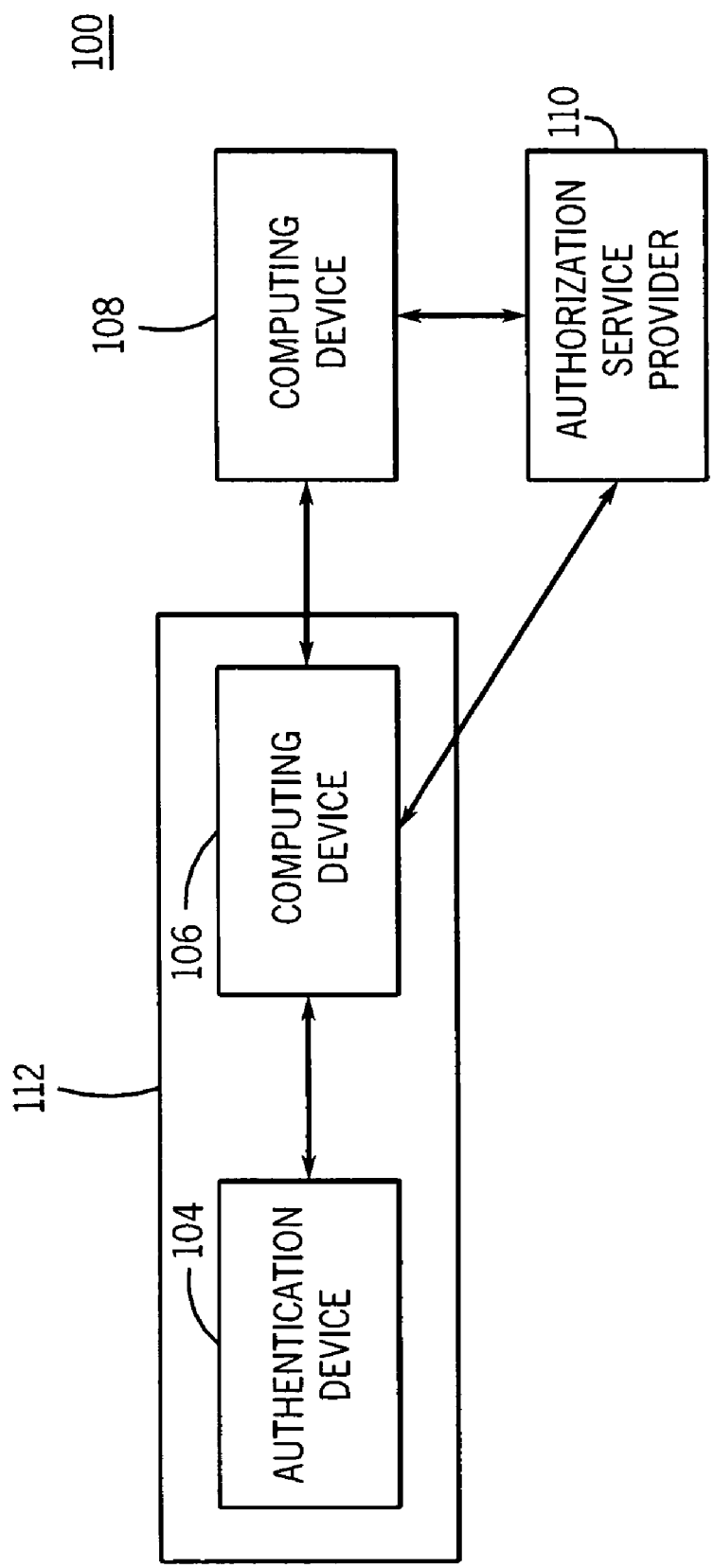
FIG. 1 is a representation of an exemplary implementation of an apparatus that comprises one or more authentication devices, one or more computing devices, and one or more authorization service provider components.

Turning to FIG. 1, the apparatus 100 in one example comprises one or more authentication devices 104, one or more computing devices 106 and 108, and one or more authorization service provider components 110. The authentication device 104 and the computing device 106 in one example reside at a location 112. For example, the authentication device 104 is positioned near the computing device 106 and is in communication with the computing device 106.

The authentication device 104 verifies that the computing device 106 resides at the location 112. In one example, the location 112 comprises a physical location, such as a room. The authentication device 104 is located near the computing device 106 within the room. In another example, the location 112 comprises a network. The authentication device 104 and the computing device 106 are located within the network. The network in one example comprises a local area network ("LAN"), a private network, or a home network.

The authentication device 104 communicates with the computing device 106 to authenticate the computing device 106 for a data transfer. For example, the authentication device 104 may receive a request from the computing device 108 for authentication of the computing device 106.

The computing devices 106 and 108 in one example exchange information. The information in one example comprises digital content, sensitive documents, financial information, and/or the like. For example, the computing device 108 may comprise a video content provider and the computing device 106 may comprise a customer of the video content provider. The computing device 106 may request video content transfer from the computing device 108. The computing device 108 in one example desires authentication of the computing device 106 by the authentication device 104 before sending the information to the computing device 106. The computing device 108 in one example employs the authorization service provider component 110 to control the authentication of the computing device 106.

The authorization service provider component 110 interfaces with the computing devices 106 and 108 for authorization and/or authentication of one or more of the computing devices 106 and 108. For example, one or more of the computing devices 106 and 108 may desire authentication of the other one of the computing devices 106 and 108 before beginning the data transfer. The authorization service provider component 110 stores encryption information, decryption information, and authentication challenge information. For example, the authorization service provider component 110 stores private keys for encryption and/or decryption of authentication challenges. The authorization service provider component 110 also has knowledge of the private keys available to the authentication device 104 for responding to the authentication challenges.

An illustrative description of one exemplary operation of the apparatus 100 is now presented, for explanatory purposes. A user of the computing device 106 wishes to securely transfer information between the computing device 108 and the computing device 106. The computing device 108 in one example desires authentication of the computing device 106 before sending the information to the computing device 106.

To request a data transfer from the computing device 108, the computing device 106 in one example sends a data transfer request to the computing device 108. The computing device 108 in one example determines that the data transfer requires location authentication to be approved. For example, the computing device 108 wants to verify that computing device 106 is at the location 112 and that an intercepting computing device has not deceived the computing device 108 by appearing to be the computing device 106.

In response to the data transfer request, the computing device 108 sends an authentication initiation message to the authorization service provider component 110. The authorization service provider component 110 determines an address and private key information for the authentication device 104 associated with the computing device 106. The authorization service provider component 110 selects one or more private keys of the available private keys at the authentication device 104 for encrypting and/or decrypting authentication challenges.

In response to the authentication initiation message, the authorization service provider component 110 sends a response message to the computing device 108. The response message comprises one or more private key identifiers, an authentication challenge string, and an authentication challenge key. The authorization service provider component 110 employs the one or more private keys to encrypt the authentication challenge string. The computing device 108 saves the authentication challenge key and sends a request for authentication to the computing device 106. The request for authentication sends the one or more private key identifiers and the authentication challenge string to the computing device 106. Upon receipt of the request for authentication, the computing device 106 forwards the request for authentication to the authentication device 104.

Upon installation of the authentication device 104, the authentication device 104 determines an initial location of the authentication device 104. To begin authentication of the computing device 106, the authentication device 104 determines a current location of the authentication device 104. The authentication device 104 authenticates the computing device 106 through employment of a determination that the current location of the authentication device matches the initial location of the authentication device 104. The authentication device 104 compares the current location of the authentication device 104 with the initial location of the authentication device 104. If the current location of the authentication device 104 matches the initial location of the authentication device 104 (e.g., the authentication device 104 hasn't moved since installation), then the authentication device 104 employs the one or more private key identifiers to locate one or more private keys. The authentication device 104 employs the one or more private keys to decrypt the authentication challenge string into an authentication challenge response.

The authentication device 104 sends the authentication challenge response to the computing device 106. The computing device 106 forwards the authentication challenge response to the computing device 108. The computing device 108 analyzes the authentication challenge response to determine whether the computing device 106 is authenticated for the data transfer. For example, the computing device 108 compares the authentication challenge response with the authentication challenge key received from the authorization service provider component 110. If the authentication challenge response matches the authentication challenge key, then the authentication challenge response represents that the computing device 106 is authenticated and the data transfer can be sent from the computing device 108 to the computing device 106.

An illustrative description of another exemplary operation of the apparatus 100 is now presented, for explanatory purposes. The users of the computing devices 106 and 108 wish to securely transfer information from the computing device 108 to the computing device 106. The computing device 108 in one example desires authentication of the computing device 106 before sending the information to the computing device 106, as described above. The computing device 106 may also desire authentication of the computing device 108 before exchanging information with the computing device 108. For example, the authorization service provider component 110 authenticates both of the computing devices 106 and 108 before beginning the data transfer.

To request the data transfer from the computing device 108 to the computing device 106, the computing device 106 in one example sends a data transfer request to the computing device 108. The computing device 108 in one example determines that the data transfer requires location authentication to be approved. For example, the computing device 108 wants to verify that computing device 106 is at the location 112, as described above. Also, the computing device 106 wants to verify that computing device 108 is authenticated and that an intercepting computing device has not deceived the computing device 106 by appearing to be the computing device 108. For example, the computing device 106 wants to prevent the intercepting computing device from stealing account or identity information from the computing device 106. The computing device 106 also wants to prevent receiving fraudulent information from the intercepting computing device.

In response to the data transfer request, the computing device 108 sends an authentication initiation message to the computing device 106. The computing device 106 forwards the authentication initiation message to the authorization service provider component 110. The authorization service provider component 110 determines an address and private key information for the authentication device 104 associated with the computing device 106. The authorization service provider component 110 selects one or more private keys of the available private keys at the authentication device 104 for encrypting and/or decrypting authentication challenges.

In response to the authentication initiation message, the authorization service provider component 110 sends a request for authentication to the computing device 106. The request for authentication comprises one or more private key identifiers and an authentication challenge string. Upon receipt of the request for authentication, the computing device 106 forwards the request for authentication to the authentication device 104.

The authentication device 104 compares the current location of the authentication device 104 with the initial location of the authentication device 104, as described above. If the current location of the authentication device 104 matches the initial location of the authentication device 104, then the authentication device 104 employs the one or more private keys to decrypt the authentication challenge string into an authentication challenge response, as described above.

The authentication device 104 sends the authentication challenge response to the computing device 106. The computing device 106 forwards the authentication challenge response to the authorization service provider component 110. The authorization service provider component 110 analyzes the authentication challenge response to determine whether the computing device 106 is authenticated for the data transfer. For example, the authorization service provider component 110 compares the authentication challenge response with an authentication challenge key. If the authentication challenge response matches the authentication challenge key, then the authentication challenge response represents that the computing device 106 is authenticated and the data transfer can be sent from the computing device 108 to the computing device 106. Then authorization service provider component 110 may execute an analogous authentication process of the computing device 108 for the computing device 106, assuming an authentication device (e.g., analogous to the authentication device 104) is available at the location of computing device 108.

Figure 2:
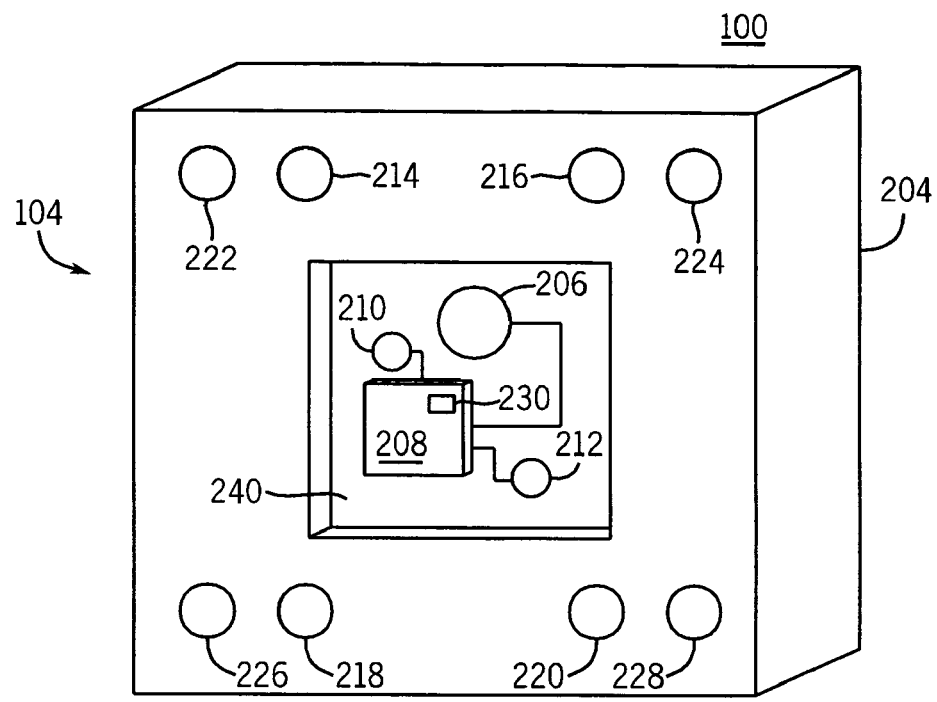
FIG. 2 is one representation of a base portion of the authentication device of the apparatus of FIG. 1.
Figure 3:
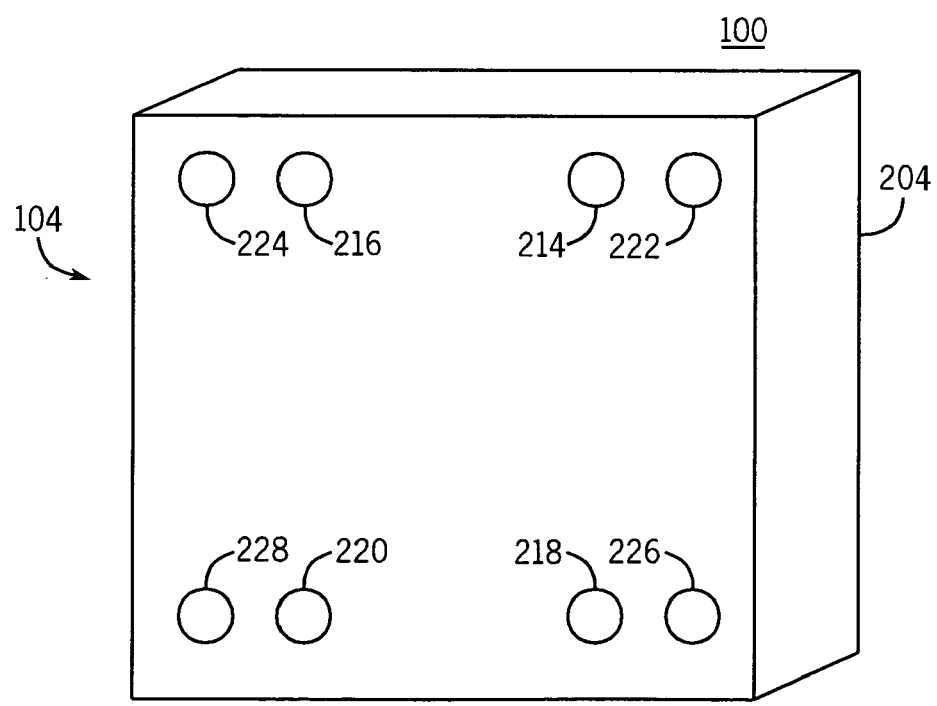
FIG. 3 is another representation of the base portion of the authentication device of the apparatus of FIG. 2.

Referring to FIGS. 2-5, the authentication device 104 in one example comprises a base portion 204 and a cover portion 404. FIG. 2 shows a top view of the base portion 204 and FIG. 3 shows a bottom view of the base portion 204. The base portion 204 in one example supports a location sensor 206, an authorization component 208, a communication contact 210, a power contact 212, and one or more attachment holes 214, 216, 218, 220, 222, 224, 226 and 228. An outer surface of the base portion 204 is constructed of a strong material (e.g., metal) and comprises a cavity 240 for the authorization component 208, the location sensor 206, the communication contact 210, and the power contact 212.

Figure 4:
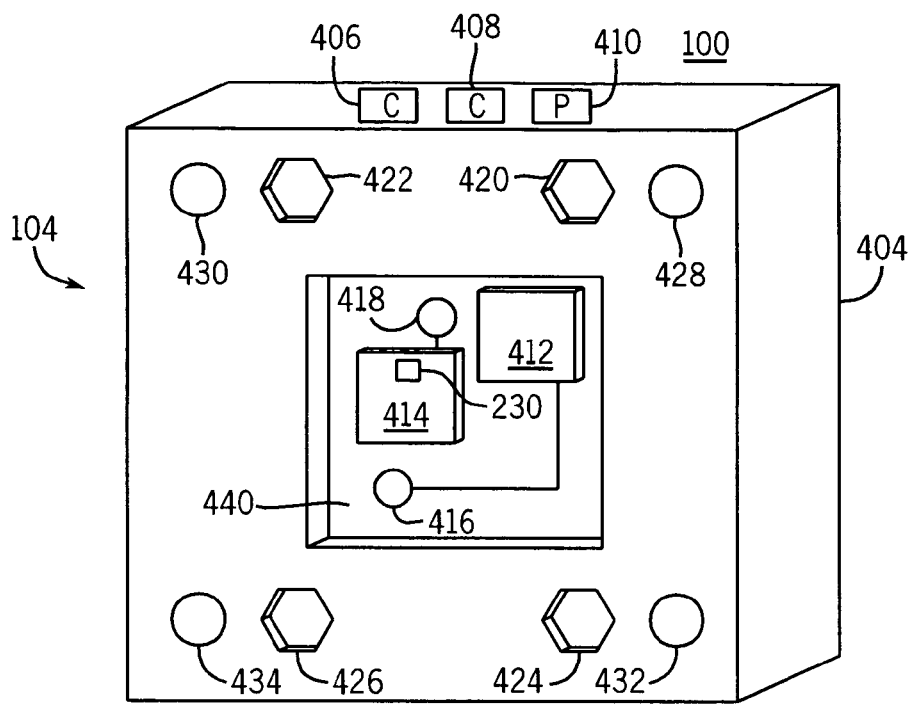
FIG. 4 is one representation a cover portion of the authentication device of the apparatus of FIG. 1.
Figure 5:
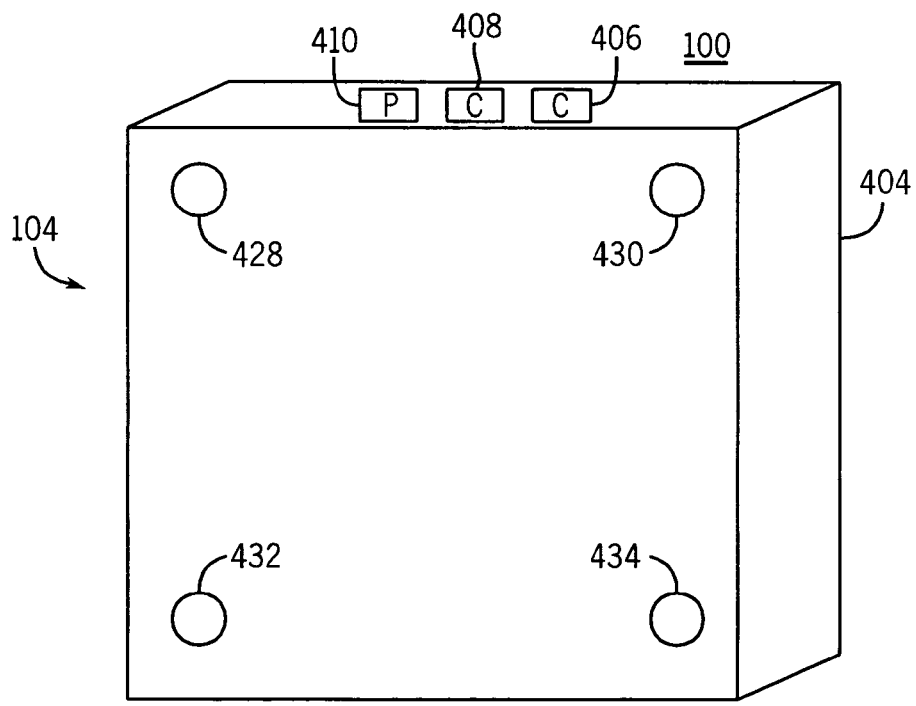
FIG. 5 is another representation of the cover portion of the authentication device of the apparatus of FIG. 4.

FIG. 4 shows a bottom view of the cover portion 404 and FIG. 5 shows a top view of the cover portion 404. The cover portion 404 in one example comprises one or more communication ports 406 and 408, a power port 410, a power distribution component 412, a communication component 414, a power contact 416, a communication contact 418, one or more indentations 420, 422, 424 and 426, and one or more attachment holes 428, 430, 432 and 434. An outer surface of the cover portion 404 is constructed of a strong material (e.g., metal) and comprises a cavity 440 for the power distribution component 412, the communication component 414, the power contact 416, and the communication contact 418.

Figure 6:
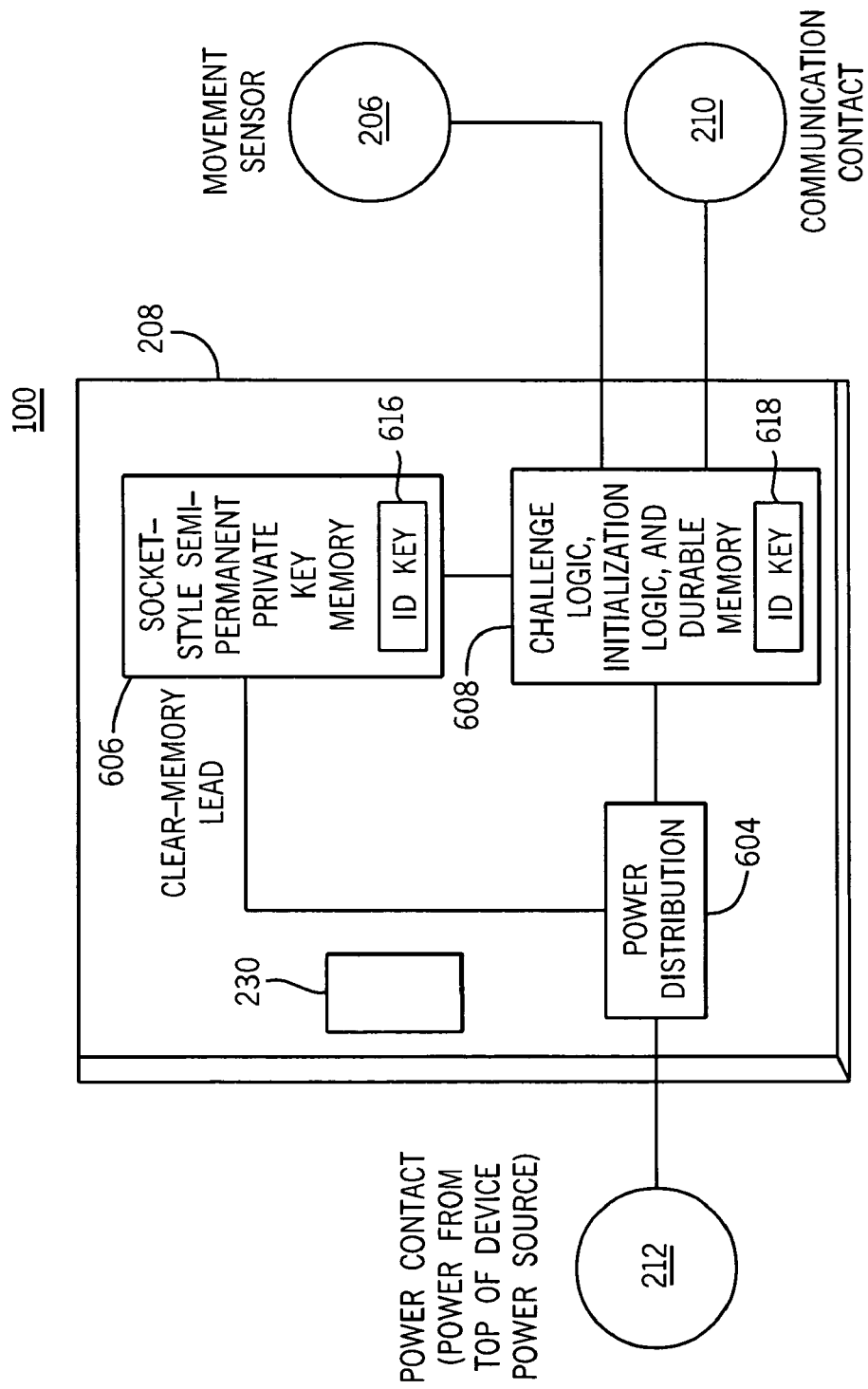
FIG. 6 is a representation of an authorization component of the authentication device of the apparatus of FIG. 1.

Referring to FIGS. 1 and 6, the sensor component 206 of the authentication device 104 determines location information of the authentication device 104. Upon installation and initialization of the authentication device 104, the location sensor 206 determines an initial location of the authentication device 104. Upon installation and initialization, a service provider agent that installs the authentication device 104 in one example provides electrical power to the location sensor 206 and the authorization component 208. Upon receipt of electricity, the location sensor 206 determines the initial location of the authentication device 104. The location sensor 206 sends the initial location to storage for use in subsequent authentication challenges. The authorization component 208 in one example stores the initial location of the authentication device 104.

The sensor component 206 in one example comprises a global positioning system ("GPS") receiver. The location sensor 206 in one example generates three dimensional location information. For example, the location sensor 206 determines longitude, latitude, and altitude of the authentication device 104. The location sensor 206 in one example represents the three dimensional location with a string of fifty-five bits. For example, the longitude and latitude are represented with twenty-two bits each and the altitude is represented with eleven bits. The three dimensional location in one example comprises an altitude with an accuracy of two meters and a range of 4000 meters and a latitude and longitude with an accuracy of ten meters and a range of 40,000,000 meters.

During operation, the location sensor 206 determines the current location of the authentication device 104. The authorization component 208 communicates with the location sensor 206 to acquire location information from the location sensor 206. The authorization component 208 compares the current location of the authentication device 104 with the initial location of the authentication device 104 to authenticate the computing device 106. Upon receipt of a request for authentication, the authorization component 208 accesses the initial location of the authentication device 104 to compare with the current location of the authentication device 104.

The authorization component 208 in one example comprises a state machine controller such as a microsequencer, a microprocessor, a programmable logic device ("PLD"), or a field programmable gate array ("FPGA"). The authorization component 208 in one example comprises an instance of the recordable data storage medium 230, as described herein.

The authorization component 208 comprises a power distribution component 604, a private key module 606, and a challenge logic, initialization logic, and durable memory component 608. The power distribution component 604 supplies power to various components of the authorization component 208. For example, the power distribution component 604 supplies power to the private key module 606. The private key module 606 in one example stores one or more private keys and one or more private key identifiers. In one example, the private key module 606 stores the private keys and one or more private key identifiers in volatile memory. In another example, the private key module 606 stores the private keys and one or more private key identifiers in non-volatile memory but erases the private keys upon occurrence a possible security breach. Upon an attempt to move or open the authentication device 104, the power distribution component 604 may cut off power to the private key module 606 to erase the one or more private keys. As a security measure, the power distribution component 604 may cut the power from the private key module 606 to disable the authentication device 104 from processing subsequent requests for authentication.

The private keys are employable for encryption and/or decryption of information. The authorization component 208 in one example employs one or more of the private key identifiers and the array of private keys to decrypt a request for authentication of the computing device 106. The challenge logic, initialization logic, and durable memory component 608 comprises logic circuitry and non-volatile memory. Upon power loss, the challenge logic, initialization logic, and durable memory component 608 retains the authentication challenge logic, initialization logic, and durable memory information.

Figure 7:
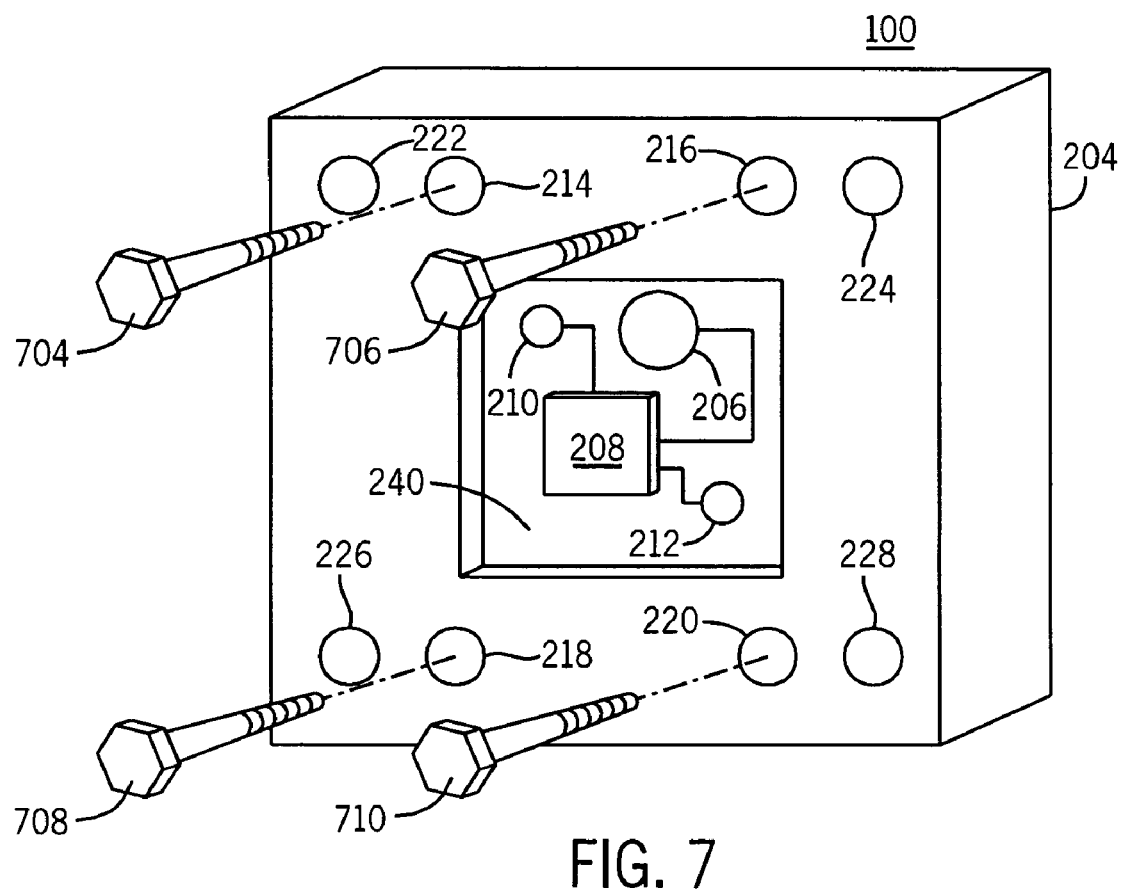
FIG. 7 is a representation of an attachment of the base portion of the authentication device of the apparatus of FIG. 2 to a surface.

Referring to FIGS. 1 and 7, during installation of the authentication device 104, the base portion 204 of the authentication device 104 is fixed to a surface near the computing device 106 and/or is in communication with the computing device 106 through a network. For example, the authentication device 104 may attach to a wall near the computing device 106. A service provider agent associated with the authorization service provider component 110 in one example attaches the base portion 204 to the wall. For example, the service provider agent engages one or more fasteners 704, 706, 708, and 710 with the wall through the holes 214, 216, 218, and 220. The fasteners 704, 706, 708, and 710 in one example comprise screws, or the like.

Figure 8:
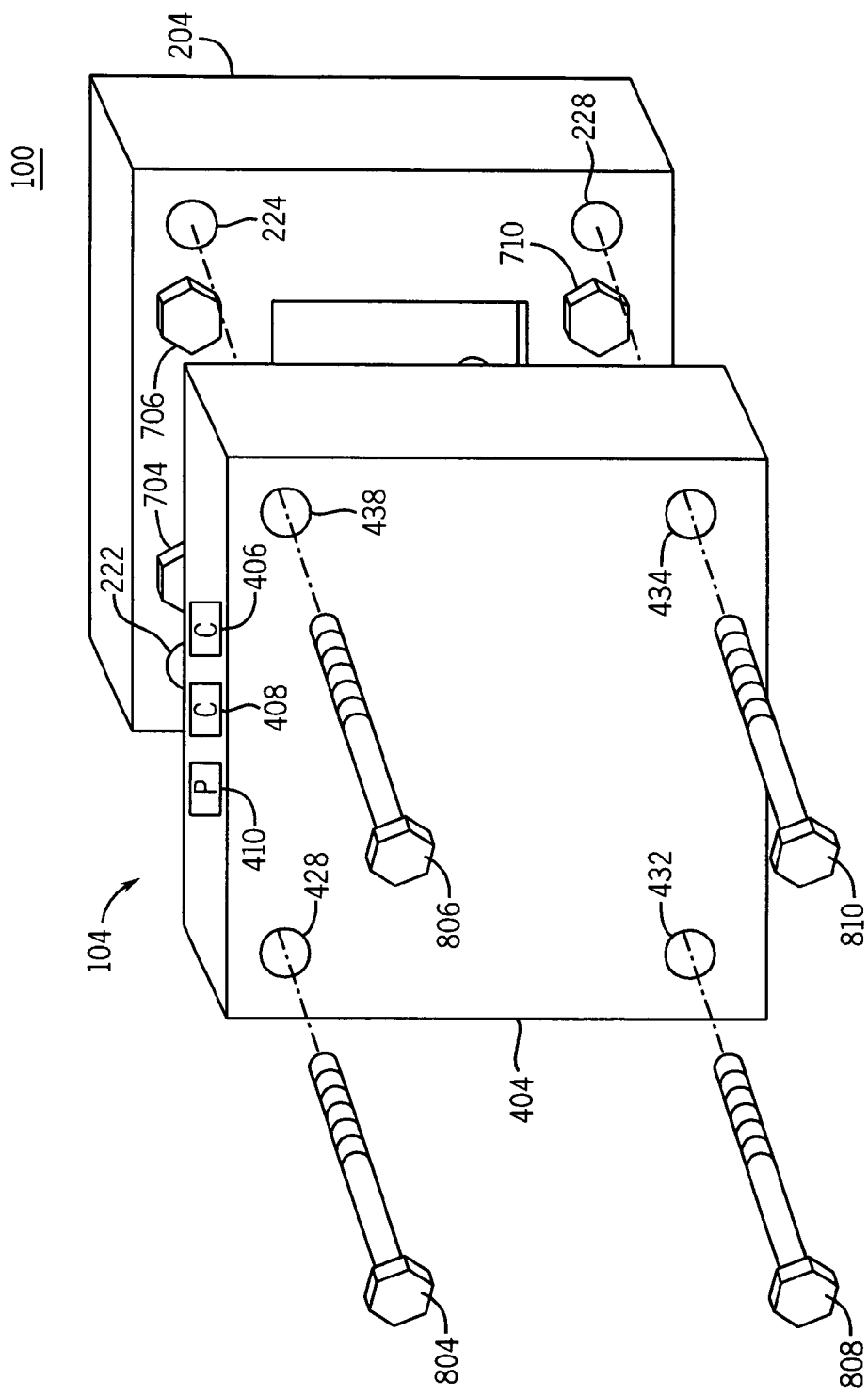
FIG. 8 is a representation of an attachment of the cover portion of the authentication device of the apparatus of FIG. 4 to the base portion of the authentication device of the apparatus of FIG. 2.

Referring to FIG. 8, the service provider agent attaches the cover portion 404 to the base portion 204 to complete the installation of the authentication device 104. Once installed, the authentication device 104 is sensitive to entry and movement attempts. The cover portion 404 attaches to the base portion 204 to provide a secure shell for the electronic components within the authentication device 104. For example, the service provider agent aligns the one or more holes 428, 430, 432, and 434 of the cover portion 404 with the one or more holes 222, 224, 226, and 228 of the base portion 204. The service provider agent then employs one or more fasteners 804, 806, 808, and 810 to attach the cover portion 404 to the base portion 204 through the holes 222, 224, 226, 228, 428, 430, 432, and 434. The fasteners 804, 806, 808, and 810 in one example comprise screws, or the like. Upon connection of the cover portion 404 with the base portion 204, the heads of the fasteners 704, 706, 708, and 710 in one example fit into the indentations 420, 422, 424, and 426 (FIG. 4) of the cover portion 404.

Referring to FIGS. 2, 4, and 8, once the cover portion 404 is fixed to the base portion 204, the power contact 212 makes a connection with the power contact 416, and the communication contact 210 makes a connection with the communication contact 418. The power port 410 inputs electricity for the authentication device 104. For example, the power port 410 provides electricity to the power distribution component 412. The power distribution component 412 provides electricity to the power distribution component 604 through the connection between the power contacts 416 and 212.

Referring to FIG. 6, upon receipt of electricity, the authorization component 208 in one example checks if the private keys have been previously initialized. If the private keys have not been previously initialized, the authorization component 208 reads the private key identifier and stores the private key identifier with an initialized-state value in the challenge logic, initialization logic, and durable memory component 608. For example, the power distribution component 604 initializes the private key module 606 and the challenge logic, initialization logic, and durable memory component 608 reads the private key identifier from the private key module 606.

The authorization service supplier 110 in one example provides the private key module 606 with an identification key 616. The challenge logic, initialization logic, and durable memory component 608 comprises a non-externally readable identification key 618. The identification keys 616 and 618 in one example comprise identification strings. Upon power-up, initialization logic in the challenge logic, initialization logic, and durable memory component 608 compares the identification key 616 with the identification key 618. If the identification keys 616 and 618 match, then the initialization logic in the challenge logic, initialization logic, and durable memory component 608 causes the identification key 616 in the private key module 606 to be zeroed and then continues initialization. For example, the initialization logic in the challenge logic, initialization logic, and durable memory component 608 queries the movement sensor 206 for the initial location of the authentication device 104. The durable memory of the initialization logic in the challenge logic, initialization logic, and durable memory component 608 stores the initial location for later use during authentication. If the identification keys 616 and 618 do not match, then the initialization logic in the challenge logic, initialization logic, and durable memory component 608 causes initialization to fail and causes the private keys in private key module 606 to be zeroed.

Since the private key module 606 in one example stores the private keys in volatile memory, the private key module 606 keeps a copy of the private keys as long as the private key module 606 receives power. If a connection is broken between the power contact 212 and the power contact 416, then the private key module 606 erases the private keys to prevent processing of subsequent authentication requests. For example, an attempt to separate the cover portion 404 from the base portion 204 breaks the connection between the power contact 212 and the power contact 416, and the private key module 606 erases the private keys.

In another example, if the power distribution component 412 loses power for longer than a power backup time limit, then the private key module 606 erases the private keys. For example, a power outage in one example causes the power distribution component 412 to lose power for longer than the power backup time limit. The power distribution component 412 in one example comprises a backup battery that supplies electricity to the authentication device 104 for a period of time until the power backup time limit expires.

Upon a loss of power to the authentication device 104 from a separation of the cover portion 404 and the base portion 204 or from a loss of power longer than the power backup time limit, the private key module 606 erases the private keys. The authorization component 208 in one example will reject any subsequent requests for authentication received at the authentication device 104. For example, the authorization component 208 may indicate to the computing device 108 that the computing device 106 is not authentic based on the lack of private keys at the authentication device 104.

The authentication device 104 is communicatively coupled with the computing devices 106 through one or more of the communication ports 406 and 408. For example, a network cable connects with the communication ports 406 and 408 to couple the computing device 106 with the authentication device 104. The communication ports 406 and 408 in one example receive one or more requests by the computing device 108 for authentication of the computing device 106.

The authentication device 104 obtains the request for authentication through one or more of the communication ports 406 and 408 and routes the request for authentication to the communication component 414. The communication component 414 communicates with the communication ports 406 and 408 and the authorization component 208. For example, the communication component 414 obtains the request for authentication from one or more of the communication ports 406 and 408 and directs the request for authentication to the authorization component 208 through the communication contacts 210 and 418. The communication component 414 comprises an instance of the recordable data storage medium 230, as described herein.

The communication component 414 in one example obtains the request for authentication and passes the request for authentication to the communication contact 418. When the cover portion 404 is attached to the base portion 204, the communication contact 418 makes a connection with the communication contact 210. The authorization component 208 in one example obtains the request for authentication through the communication contact 210.

Upon receipt of the request for authentication, the authorization component 208 reads the initial location from the challenge logic, initialization logic, and durable memory component 608 and a current location of the authentication device 104 from the location sensor 206. The authorization component 208 in one example compares the initial location to the current location. If the location key does not match the current location, within a specified error range, then the authentication device 104 in one example indicates to the computing devices 106 and 108 and/or the authorization service provider component 110 that the computing device 106 is not authentic, and the private key module 606 erases the private keys.

The request for authentication comprises one or more identifiers, for example an authorization component identifier and a private key identifier. If the initial location matches the current location, the challenge logic of the challenge logic, initialization logic, and durable memory component 608 in one example compares the received authorization component identifier and the received private key identifier with the authorization component identifier of the authorization component 208 and the private key identifier of the private key module 606.

If the identifiers of the request for authentication do not match the authorization component identifier of the authorization component 208 and the private key identifier of the private key module 606, then the authentication device 104 in one example indicates to the computing devices 106 and 108 and/or the authorization service provider component 110 that the computing device 106 is not authentic.

If the identifiers of the request for authentication match the authorization component identifier of the authorization component 208 and the private key identifier of the private key module 606, then the challenge logic of the challenge logic, initialization logic, and durable memory component 608 chooses a private key from the private key module 606 to decrypt the request for authentication. For example, the challenge logic, initialization logic, and durable memory component 608 chooses the private key based on a private key identifier, time of day, validation type, and/or user name. The challenge logic of the challenge logic, initialization logic, and durable memory component 608 employs the private key to run a decryption algorithm on the request for authentication. The authorization component 208 in one example sends an decrypted challenge response to indicate to the computing device 108 that the computing device 106 is authentic. The challenge response in one example comprises a decrypted request for authentication. Upon receipt of the challenge response, the computing device 106 and the computing device 108 can securely transfer private information.

If the request for authentication is not authenticated, the authorization component 208 in one example sends a message through the communication component 414 to indicate to the computing device 108 that the computing device 106 is not authentic. Upon receipt of the message, the computing devices 106 and 108 cannot securely transfer private information. The authorization component 208 in one example erases the private keys from the private key module 606 and sends a message to the authorization service provider component 110. To re-initialize the authentication device 104 for subsequent authentication challenges, a service provider agent in one example visits the location 112 to install new private keys in the private key module 606.

The apparatus 100 in one example comprises a plurality of components such as one or more of electronic components, hardware components, and computing device software components. A number of such components can be combined or divided in the apparatus 100. An exemplary component of the apparatus 100 employs and/or comprises a set and/or series of computing device instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable media. Examples of a computer-readable medium for the apparatus 100 comprise the recordable data storage medium 230 of the location sensor 206, the authorization component 208, and/or the communication component 414. For example, the computer-readable medium for the apparatus 100 comprises one or more of a magnetic, electrical, optical, biological, and atomic data storage medium.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
    an authentication device that authenticates a computing device, in communication with the authentication device, through employment of a determination that a current location of the authentication device matches an initial location of the authentication device;
    wherein one or more private keys employable for encryption and/or decryption of information are erased via an automatic cutoff of power initiated internal to the authentication device upon an attempt to move the authentication device.

2. The apparatus of claim 1, wherein the computing device comprises a first computing device; and wherein the authentication device makes the determination that the current location of the authentication device matches the initial location of the authentication device in response to a request from a second computing device for authentication of the first computing device for a data transfer from the second computing device to the first computing device.

3. The apparatus of claim 2, wherein the request from the second computing device comprises an authentication challenge string; and
   wherein the authentication device stores the one or more private keys, and wherein if the current location of the authentication device matches the initial location of the authentication device, then the authentication device employs one or more of the one or more private keys to decrypt the authentication challenge string into an authentication challenge response.

4. The apparatus of claim 3, wherein the authentication device sends the authentication challenge response to the second computing device, and wherein the second computing device analyzes the authentication challenge response to determine whether the first computing device is authenticated for the data transfer.

5. The apparatus of claim 4, wherein the second computing device comprises an authentication challenge key to compare with the authentication challenge response received from the authentication device; and
   wherein if the authentication challenge response matches the authentication challenge key, then the authentication challenge response represents that the first computing device is authenticated and the data transfer can be sent from the second computing device to the first computing device.

6. The apparatus of claim 3, wherein upon determination that the current location of the authentication device does not match the initial location of the authentication device, the authentication device prevents authentication of the first computing device and disables the one or more private keys.

7. The apparatus of claim 6, wherein the authentication device stores the one or more private keys in volatile memory, and wherein upon determination that the current location of the authentication device does not match the initial location of the authentication device, the authentication device cuts off power to the volatile memory to erase the one or more private keys.

8. The apparatus of claim 1, wherein the authentication device comprises a base portion, a cover portion, and one or more electronic components that serve to authenticate the computing device; and
   wherein the base portion is fixed to a surface near the computing device, and wherein the cover portion is fixed to the base portion, to provide a secure shell for the one or more electronic components.

9. The apparatus of claim 8, wherein a first one of the base and cover portions receives electricity through a power port, and wherein a second one of the base and cover portions receives electricity through an electrical contact with the first one of the base and cover portions; and
   wherein upon separation of the second one of the base and cover portions from the first one of the base and cover portions, the second one of the base and cover portions loses power and prevents authentication of the computing device.

10. The apparatus of claim 9, wherein the second one of the base and cover portions electrically supports one or more of the one or more electronic components that store the one or more private keys, and wherein the authentication device employs one or more of the one or more private keys to authenticate the computing device; and
    wherein a loss of power in the second one of the base and cover portions erases the one or more private keys from the one or more of the one or more electronic components.

11. The apparatus of claim 1, wherein the authentication device comprises a location sensor; and
    wherein upon initialization of the authentication device, the location sensor sets the initial location of the authentication device; and
    wherein the location sensor determines the current location of the authentication device; and wherein the authentication device compares the current location with the initial location to authenticate the computing device.

12. The apparatus of claim 11, wherein the location sensor comprises a global positioning system component, and wherein the global positioning system component measures the initial location and the current location of the authentication device as a three-dimensional location of latitude, longitude, and altitude.

13. The apparatus of claim 1, wherein the authentication device allows authentication of the computing device upon the determination that the current location of the authentication device matches the initial location of the authentication device within a specified error range.

14. The apparatus of claim 1, wherein the one or more private keys are erased upon an attempt to open the authentication device.

15. The apparatus of claim 1, wherein the one or more private keys are erased via an automatic cutoff of power upon the attempt to open the authentication device or move the authentication device.

16. The apparatus of claim 1, wherein the one or more private keys are erased via an automatic cutoff of power upon an attempt to open the authentication device.

17. The apparatus of claim 1, wherein the current location comprises a network.

18. The apparatus of claim 1, wherein the current location comprises a room.

19. The apparatus of claim 1, wherein a power distribution component internal to the authentication device initiates the cutoff of power.

20. A method, comprising the steps of:
    receiving a request from a second computing device to authenticate a first computing device for a data transfer from the second computing device to the first computing device;
    determining a current location of an authentication device, in communication with the first computing device, in response to the request from the second computing device; and
    authenticating the first computing device if the current location of the authentication device matches an initial location of the authentication device;
    wherein one or more private keys employable for encryption and/or decryption of information are erased via an automatic cutoff of power initiated internal to the authentication device upon an attempt to move the authentication device.

21. The method of claim 20, wherein the request from the second computing device comprises an authentication challenge string, and wherein the step of authenticating the first computing device if the current location of the authentication device matches the initial location of the authentication device comprises the steps of:

comparing the current location of the authentication device with the initial location of the authentication device; and employing, if the current location of the authentication device matches the initial location of the authentication device, the one or more private keys to decrypt the authentication challenge string into an authentication challenge response.

22. The method of claim 21, further comprising the steps of:

sending the authentication challenge response to the second computing device; and analyzing the authentication challenge response to determine whether the first computing device is authenticated for the data transfer from the second computing device to the first computing device.

23. The method of claim 22, wherein the step of analyzing the authentication challenge response to determine whether the first computing device is authenticated for the data transfer from the second computing device to the first computing device comprises the steps of:

comparing the authentication challenge response with an authentication challenge key; and determining that the data transfer can be sent from the second computing device to the first computing device if the authentication challenge response matches the authentication challenge key.

24. The method of claim 21, further comprising the steps of:

storing the one or more private keys in volatile or non-volatile memory; and erasing the one or more private keys upon determination that the current location of the authentication device does not match the initial location of the authentication device.

25. The method of claim 21, further comprising the steps of:

storing the one or more private keys in volatile memory; and discontinuing a power supply to the volatile memory to erase the one or more private keys upon determination that the current location of the authentication device does not match the initial location of the authentication device.

26. The method of claim 20, wherein the authentication device comprises a base portion, a cover portion, and one or more electronic components that store one or more private keys employable to authenticate the first computing device, the method further comprising the steps of:

attaching the base portion to a surface near the first computing device;

attaching the cover portion to the base portion to provide a secure shell for the one or more electronic components; and erasing the one or more private keys if the cover portion is removed from the base portion.

27. The method of claim 20, wherein the authentication device comprises a base portion, a cover portion, and one or more electronic components that serve to authenticate the first computing device, the method further comprising the steps of:

attaching the base portion to a surface near the first computing device;

attaching the cover portion to the base portion to provide a secure shell for the one or more electronic components;

connecting a first one of the base and cover portions to a power supply;

connecting a second one of the base and cover portions to the power supply through an electrical contact with the first one of the base and cover portions;

electrically supporting, with the second one of the base and cover portions, one or more of the one or more electronic components that store the one or more private keys; and disconnecting the power supply from one or more of the one or more electronic components to erase the one or more private keys if the current location of the authentication device does not match the initial location of the authentication device.

28. A non-transitory computer-readable medium having computer executable instructions for performing steps, comprising:

means in the computer-readable medium for receiving a request from a second computing device to authenticate a first computing device for a data transfer from the second computing device to the first computing device;

means in the computer-readable medium for determining a current location of an authentication device, in communication with the first computing device, in response to the request from the second computing device; and means in the computer-readable medium for authenticating the first computing device if the current location of the authentication device matches an initial location of the authentication device;

wherein one or more private keys employable for encryption and/or decryption of information are erased via an automatic cutoff of power initiated internal to the authentication device upon an attempt to move the authentication device.

* * * * *